United States Patent [19]

Jenkins et al.

[11] Patent Number: 5,619,731
[45] Date of Patent: Apr. 8, 1997

[54] INTERACTIVE MUSIC CD AND DATA

[75] Inventors: Kimble L. Jenkins; C. Patrick Scholes, both of Memphis, Tenn.

[73] Assignee: Ardent Teleproductions, Inc., Memphis, Tenn.

[21] Appl. No.: 311,744

[22] Filed: Sep. 23, 1994

[51] Int. Cl.⁶ .............................. G06F 15/00; G06F 12/06; G11B 17/22
[52] U.S. Cl. ........................... 395/873; 395/877; 395/853; 395/477; 395/480; 369/32
[58] Field of Search .............................. 369/32; 395/872, 395/853, 842, 480, 497.04, 477, 873, 877; 84/602; 434/118

[56] References Cited

U.S. PATENT DOCUMENTS

| 4,333,143 | 6/1982 | Calder | 395/873 |
|---|---|---|---|
| 4,807,121 | 2/1989 | Halford | 395/873 |
| 4,956,768 | 9/1990 | Sidi et al. | 395/873 |
| 5,163,132 | 11/1992 | DuLac et al. | 395/873 |
| 5,228,859 | 7/1993 | Rowe | 434/118 |
| 5,245,600 | 9/1993 | Yamauchi et al. | 358/343 |
| 5,261,072 | 11/1993 | Siegel | 395/842 |
| 5,291,468 | 3/1994 | Carmon et al. | 369/47 |
| 5,291,609 | 3/1994 | Herz | 395/872 |
| 5,293,606 | 3/1994 | Sassenrath | 395/853 |
| 5,336,844 | 8/1994 | Yamauchi et al. | 84/602 |
| 5,394,382 | 2/1995 | Hu et al. | 369/32 |
| 5,396,597 | 3/1995 | Bodin et al. | 395/873 |
| 5,402,398 | 3/1995 | Yoshida | 369/32 |
| 5,414,686 | 5/1995 | Itisuka | 369/48 |
| 5,418,910 | 5/1995 | Siegel | 395/872 |
| 5,457,668 | 10/1995 | Hibino et al. | 369/32 |
| 5,471,443 | 11/1995 | Jamail et al. | 369/32 |
| 5,473,756 | 12/1995 | Traylor | 395/250 |
| 5,521,900 | 5/1996 | Ando et al. | 369/275.1 |
| 5,530,686 | 6/1996 | Schylander | 369/32 |
| 5,537,552 | 7/1996 | Ogasawara et al. | 395/250 |
| 5,539,896 | 7/1996 | Lisle | 395/477 |

OTHER PUBLICATIONS

"An Overview to Multimedia CD–ROM Production", Disc Manufacturing, Inc.
Busk, J. Philip. "Integrating Mixed–Mode CD ROM", Disc Manufacturing, Inc.
Mitchell, Gabrielle. "Music for the Eyes as Well as the ears—A Sound Future: Enhanced Audio CDs", Computer Retail Week, issue 91, p. 23.
Kenedy, Kristen. "Enhanced CD Products Need a Niche—Cultivating a Market for New Crop of Titles", Computer Retail Week, issue 610, p. 35.
Block, Debbie Galante. "The Evolving Market for Enhanced CD", CD–ROM Professional, vol. 9, No. 1, pp. 36–46. Jan. 1996.
Busk et al., Compact Disc Terminology, Disc Manufacturing Inc., pp. 8–15.

*Primary Examiner*—Tod R. Swann
*Assistant Examiner*—Conley B. King, Jr.
*Attorney, Agent, or Firm*—Fish & Richardson, P.C.

[57] ABSTRACT

Both interactively-selectable information and audio information are recorded on a compact disc medium. The music is recorded in Red Book format on the disc in a normal way so that it is reproducible by a standard CD player. The Red Book information is also re-recorded in Yellow Book format in a different area on the disc. The Yellow Book information may be compressed. A second portion of Yellow Book information includes interactively-selectable program information. The music information is not interrupted unless selected by a user.

15 Claims, 6 Drawing Sheets

5,619,731

INTERACTIVE MUSIC CD AND DATA

FIELD OF THE INVENTION

The present invention describes an interactive media which includes both music and independently interactively-selectable material. More specifically, the present invention discloses a special kind of Compact Disc and reading system for reading the Compact Disc.

BACKGROUND OF THE INVENTION

Compact Discs ("CDs") are today's medium of choice for recorded music. CDs have significant technical advantages over vinyl including a wider bandwidth. CDs are also much smaller in size and hence have been more appropriate for portable use, such as in automotive applications.

Other similar media, including mini-CDs and digital audio tapes ("DATs") are also becoming popular because of similar advantages.

While all of these media have the advantage of miniaturization, that same logistical advantage has eliminated one of the nice parts that used to be accompanied with vinyl recordings.

Since vinyl recordings were twelve inches in diameter, they had a relatively large area album jacket. This jacket had at least two printable sides, sometimes four sides and sometimes even more. Liner notes were printed on this jacket—including artwork, information about the albums and the producers, lyrics to the songs, and the like. The liner notes could be read while listening to the album, and formed a nice part of the experience.

While the same presentation has been attempted on the smaller-sized media such as CDs, the small size of this media has prevented an effective presentation. Users rarely read the CD liner notes.

It is an object of the present invention to obviate this problem in a new and completely unobvious way, while ensuring compatibility with the installed base of CD reading equipment.

SUMMARY OF THE INVENTION

The solution devised according to the inventors of the present invention takes recognition of the fact that digital media such as CDs usually has spare recording area thereon. CDs can store as much as 72-74 minutes of full-bandwidth audio material, and rarely are the audio programs actually that long. Taking recognition of this fact, the present invention modifies the contents of the CD media in a way which maintains compatibility with the installed base of reproducing equipment, but yet includes additional information thereon including videos, still pictures, and other material, which is associated with the program on the media, the making of the program, or any other information which might be interesting to the listener. This information is interactive—meaning that any information can be played at any desired time.

According to the present invention, various steps are taken so that the program being played, usually music, is not interrupted during the interactive pieces unless the user selects such an interruption. Any interactive piece can be played at any time, with a minimal wait. The present invention teaches various techniques of caching the program and interactive material that enable this advantageous operation.

DESCRIPTION OF THE PREFERRED EMBODIMENTS

Figure 1:
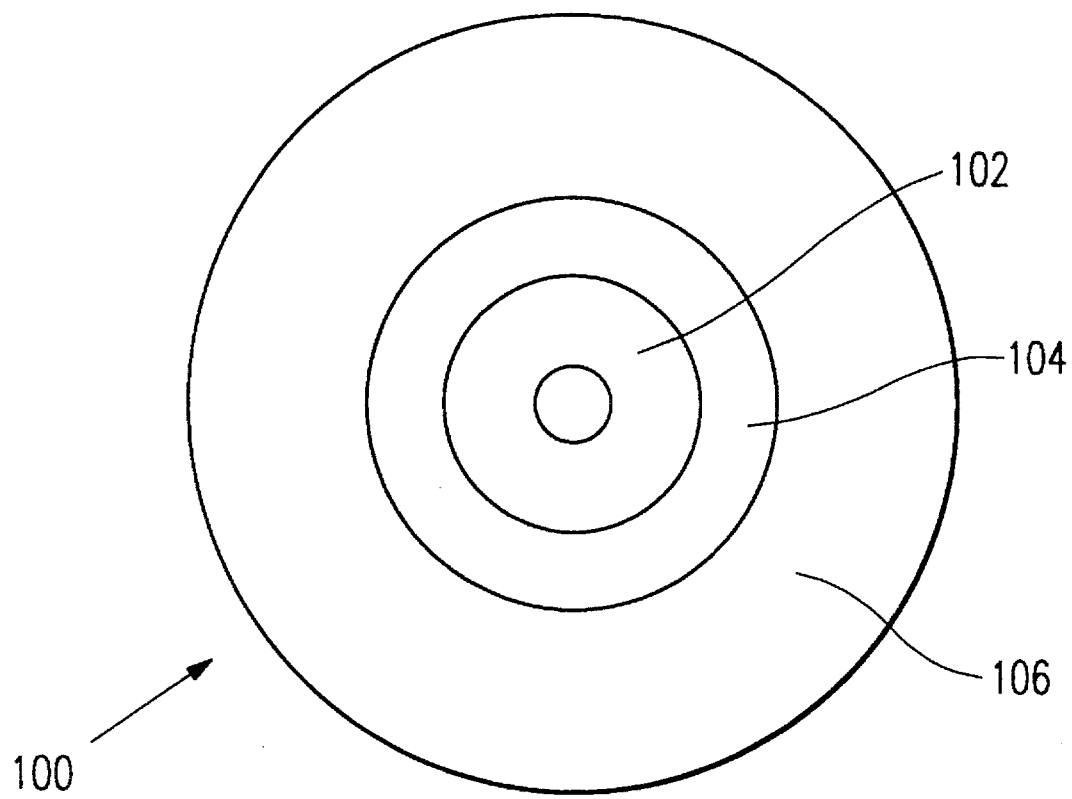
FIG. 1 shows a representation of the layout of the preferred disc media used according to the present invention.

The presently preferred embodiment will now be discussed in detail with respect to the drawings. According to the preferred embodiment, the programs are music programs on a medium which is an audio CD. The preferred modified audio CD is shown in FIG. 1.

Standard audio tracks are recorded on a CD using eight to fourteen modulation ("EFM"). The characteristics of EFM are well-known, and are described in a standard known as the Red Book, promulgated by Phillips.

Read only memory CDs, commonly known as CD-ROMs, are recorded according to a different standard known as the Yellow Book. The preferred disc of FIG. 1 includes Yellow tracks 102, 104 in Yellow Book format, and tracks 106 in Red Book format. In the preferred mode of the invention, the Yellow Book format tracks 102, 104 are all physically located within the track which a Red Book format player recognizes as track 1. The Red Book tracks are numbered as tracks 2-N, where N is the highest-numbered track on the disc.

Since tracks 2-N are recorded in conventional Red Book format, conventional CD players will recognize disc 100 as being a conventional CD audio disc. However, track 1 is not readable by a conventional red track CD reader.

The least elegant way to overcome this problem is to simply inform the user to skip over track 1 and begin the CD player at track 2. Another option is to put some Red Book audio at the beginning of track 1 which, when played, enunciates "Skip to track 2". Yet another option is locate the Yellow Book data as the outermost track on the disc. This requires some yellow book data in track 1 to command a CD-ROM player to look to track N+1 for the program information. This technique enables the user to play tracks 1-N, with track N+1 (the last track) being the Yellow Book data. Use of any of these techniques allows this CD to be playable on a conventional Red Book audio player.

CD-ROM players are also capable of playing red-track audio. The red track audio is output from a CD-ROM player as analog audio information and is not typically recognized as data by the CD-ROM player.

The inventors noticed a number of problems that would need to be solved in order to effectively incorporate yellow track information on a CD in a way that allows independent interactive selection. One important problem is how the music will be maintained during any selection of interactively-selectable yellow track data using the standard installed base of CD-ROM players. Interruption of the music program during interactive pieces would be unacceptable, unless, of course, the user requests such interruption.

According to the present invention, a user can choose any of a number of interactive videos at any time. CD-ROM players, however, have only a single read head. Therefore, the CD-ROM player needs to access the stored yellow data at the same time as it is playing the red data.

Interruptions in the music contained in the red track would be very disconcerting to the user, and hence the major design parameter of this system was prevention of unintended interruption of the music track. Since a single head device can read only one location at any time, the head must move between the interactive information and the Red Book information. There is a seek time, which ranges between 200 ms and about a second, for the head to reach its destination.

The inventors initially solved this problem by caching the entirety of the CD-ROM, including the audio and the interactive segments, into a large cache memory, e.g. a 300 Megabyte hard disc. Then, various parts of this hard disc can be read out interactively. By caching the entire CD onto the hard disc, any interactive video can be requested at any time during the playing of the red track.

While this operated acceptably, it requires that the user have 300 or so megabytes of memory available for the caching. Each time the user wants to play a CD, the entire disc is cached, which may take as long as ten to twenty minutes. Accordingly, this is not a practical solution.

According to the present invention, the information from the CD is stored into two separate caches, preferably RAM caches, following a procedure whereby each cache is continually emptied while it is being filled. The inventors of the present invention recognize that the vast majority of CD-ROM players currently being sold are so-called double speed players or faster. Audio compact discs (Red Book discs) are read by conventional players at approximately 150 kb/s. A double speed player reads the disc at double that speed, as the name implies. The inventors realized that this excess capability to read information could be used to supply information to caches and thereby allow information from two parts of the disc to be simultaneously played, even allowing for the seek time of the player's head. The read head in the player is controlled to read different parts of the data according to certain rules which maintain data in both caches. The data in the cache storing the Red Book information is being emptied at all times, but is never allowed to completely empty, in order to prevent interruption of the music track.

While doing this, the inventors found problems that no one else had ever appreciated. First, most currently-operational CD-ROM players do not pass red track format information as data—only as analog audio. This prevents the red track format information from being cached. The first embodiment of the present invention addresses and solves this problem.

The next generation of CD-ROM players does pass this information as data. Still, even when the red book format information is passed as data, the inventors noted another problem that reproduction of Red Book Audio is not sample-accurate addressable. This causes a problem with the present invention, since the caching system of the present invention must start caching again, beginning at the data where it last left off. If the caching system reads the first ¾ second of Red Book audio from the red tracks, and then accesses yellow tracks, it has no way to return to where it left off in the red tracks.

Even those more modern CD-ROM players which pass the red track audio as data have this latter problem.

First Embodiment

To overcome this technical hurdles noted above, the inventors of the present invention devised a system that provides the Red Book audio as compressed data within the Yellow Book track, as area 102. The red book information is preferably, but not necessarily, compressed before recording. Alternately, this format information may simply be bandwidth-reduced, since many CD-ROM players and computers do not reproduce the full range of fidelity which would be necessary to extract the full bandwidth information.

Yellow Book track 102 is preferably a compressed digital copy of the data in red track area 106—however, since it is in yellow track format, it will be passed as sample accurate data. We will refer to this data herein as Red Book copy tracks. Yellow area 104 includes the interactive data including the video/audio graphics and program for the album liner notes.

The red track data can be stored into Red Book copy tracks 102 in any standard way. Typically the copied red track data is stored as ".WAV" files or ".TIFF". These can be compressed using well-known schemes in the art including MACE (TM) or bit rate reduction by using 8 bit quantizing or 22 k sample rates.

Figure 2:
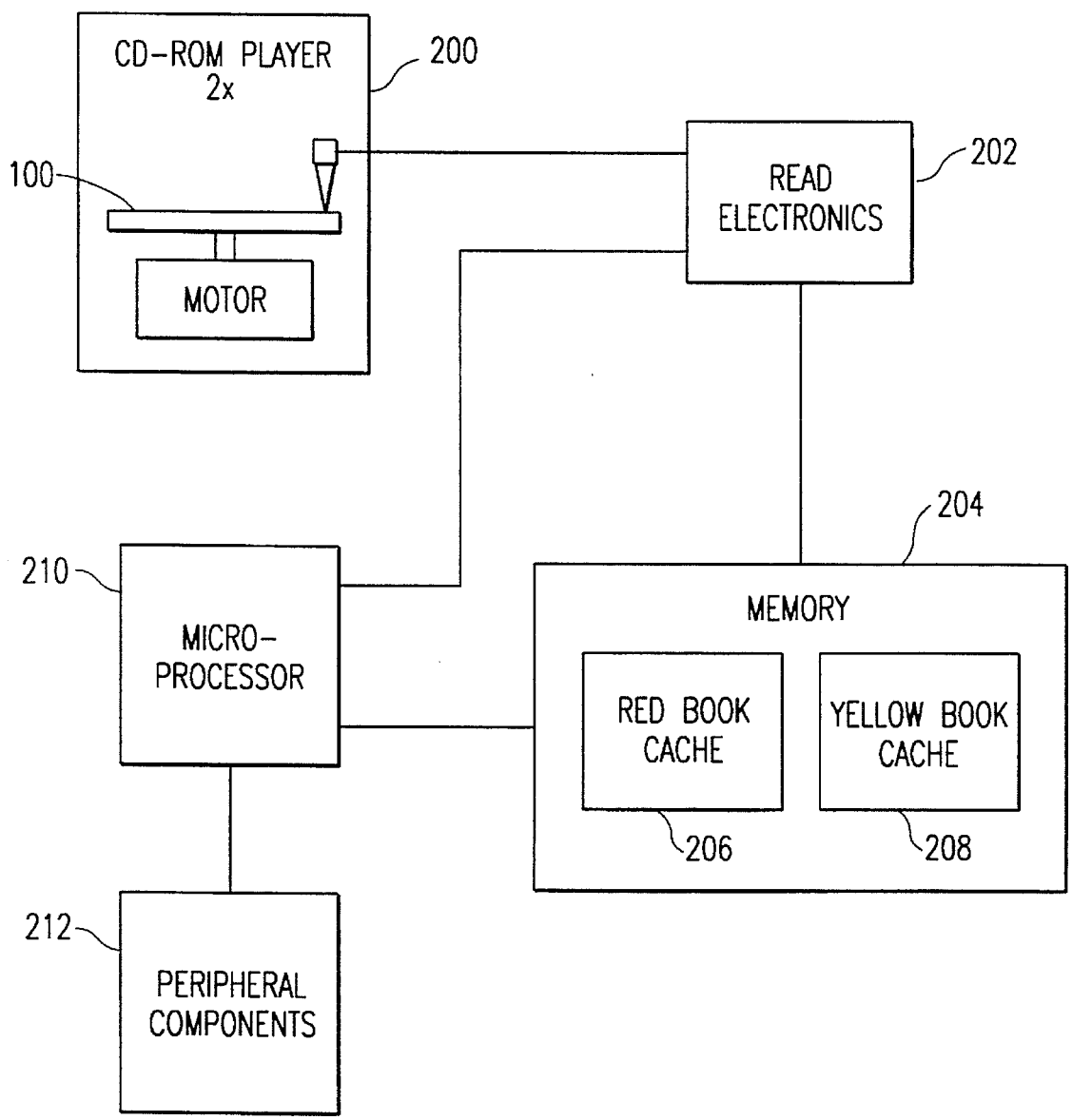
FIG. 2 shows a block diagram of the electronics used according to the present invention to reproduce and play the information.

A basic system and process for reading and using the information will now be described with reference to FIGS. 2 and 3. FIG. 2 shows the preferred hardware layout for operating the present invention. CD-ROM player 200, which can access information faster than it can play that information, receives disc 100. Read electronics 202, which may be part of the CD-ROM driver or part of a personal computer, controls the operation. A cache memory 204 is preferably the RAM of a personal computer, preferably a dual-port RAM.

Cache memory 204 is conceptually divided into a Red Book cache area 206 for the Red Book copy tracks, and a Yellow Book cache area 208.

Figure 3:
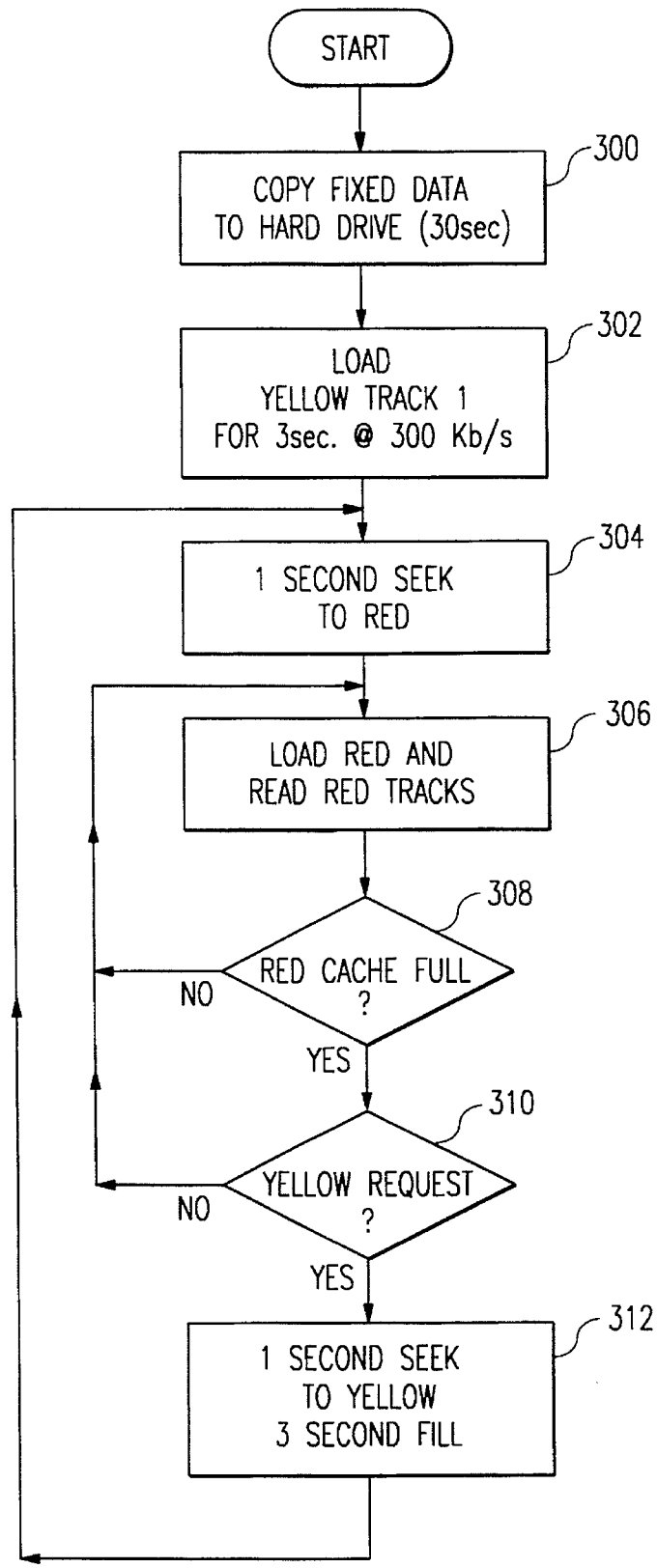
FIG. 3 shows a flowchart of the reading operation used according to the present invention.

Microprocessor 210 controls the system according to the flowchart of FIG. 3, such that the Red Book cache area 206 is continually being emptied, but never allowed to completely empty. Since a double speed CD-ROM driver is used, the Red Book cache area 206 is filled twice as fast as it is emptied. During the spare time, the CD-ROM read head is moved to access the Yellow Book information in area 104 to refresh the Yellow Book cache 208. The Yellow Book cache 208 can also be filled at least twice as fast as it is emptied. According to the present invention, the read head is moved between the Red Book copy tracks 102 and yellow data 104, alternately filling the caches, while allowing the caches to empty simultaneously with their filling.

It should be understood that the flowchart of FIG. 3 does not represent the overhead tasks which microprocessor 210 carries out, including finding addresses from which to read and write. Those having ordinary skill in the art understand how to control the processor 210 and its peripheral components 212 to effect these conventional overhead tasks.

The caching process of the present invention is conceptually analogous to two buckets, each with a hole in the bottom, being filled from a single hose. Each bucket is filled until full, while the hole allows the information in the bucket to leak out. The hose is moved to fill the other bucket while the information leaks out of the first bucket.

The process starts at step 300 where fixed data is copied to the hard drive. This fixed data includes parts of the controlling program and other information necessary for running. It also copies the largest static images. This initial copying step is estimated to take about 30 seconds.

Step 302 reads yellow track number 1 at 300 Kb/s for 3 seconds to load 900 Kb into the yellow track cache 208. Of course, it should be understood that the data rates given herein are merely exemplary, and other data rates for fill rates and empty rates could easily be used. These preferred rates represent the process which the inventors believe represent the best trade-off between cache size and performance.

Step 304 represents the one second seek time to the Red Book copy tracks 102, followed by step 306 at which the information in Red Book copy tracks 102 is loaded into red cache 206 while the contents of red cache 206 are simultaneously read out. The red tracks are read at 150 Kb/s while the cache 206 is loaded at double that speed. It takes fives seconds to fill the 750 KB cache at this rate.

The red cache 206 is detected as being full at step 308. Once the red cache is full, step 310 detects whether there has been a user request for an interactive yellow data portion to be played. If not, reading of the Red Book copy tracks continues.

If there is a request for interactive information at step 310, however, the system fills the yellow cache 208 at step 312. This includes a one second seek to the correct area of yellow tracks 104, followed by approximately three seconds of filling the yellow cache. Once the 900 Kb cache 208 is filled, control returns to the red book copy tracks to re-fill the red cache.

The yellow track cache holds 900 Kb and is read at a reading rate of 90 kb/s. This allows the yellow cache to hold ten seconds of information. Each fill of the yellow cache requires three seconds. There are two-one second seeks, and each fill of the red tracks requires five seconds. Conversely, the red cache holds five seconds of information, which corresponds to two-one second seeks and the three second yellow cache fill.

Figure 3A:
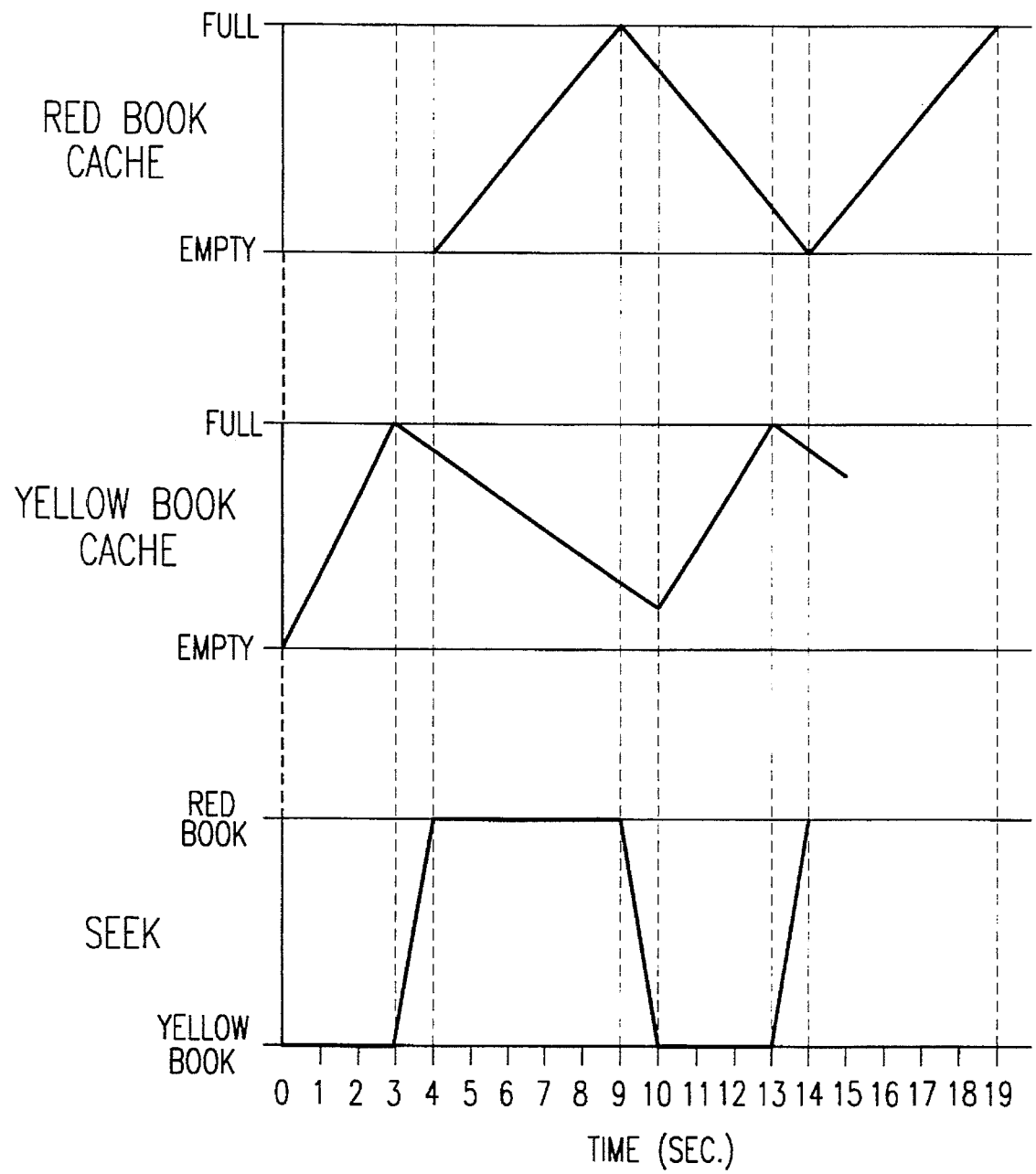
FIG. 3A shows a timing diagram of the reading operation and how it empties and fills the respective caches.

The filling and emptying sequence is shown in the time chart of FIG. 3A. FIG. 3A shows the fill state of the Red Book cache for the Red Book copy tracks ("RB cache"), the fill state of the Yellow Book cache ("YB cache") and the position of the reading head. The timing diagram of FIG. 3A assumes that both caches start out empty. At time 0, the head is at the Yellow Book information 104 and reads the information therefrom, into the YB cache, at 300 kb/s. Once the Yellow Book cache is full at time t=3 seconds, the read head seeks to the Red Book information for 1 second, followed by reading the Red Book information is read from the track at 300 kb/s while being simultaneously read out of the cache at 150 kb/s. This provides an effective fill rate of 150 kb/s. Red Book cache 206 has a capacity of 750 kb, meaning that it takes five seconds to fill while it is being emptied. At time t=9 seconds in FIG. 3A, the Red Book cache 206 is full, and therefore the head position must move from the Red Book position RB to the Yellow Book position YB. This takes one second, so at time t=10 the Yellow Book information YB continues filling the Yellow Book cache, this time at 300 Kb/s–90 Kb/s=210 Kb/s.

Three seconds is the longest time that the head can remain on the yellow book information: The Red Book cache 206 is 750 kb, and the information is read out at 150 kb/s, so the Red Book cache 206 lasts only five seconds. Since there is a one second seek time to the Yellow Book information, and a one second seek time back, this means that the system can only fill the Yellow Book cache 208 for a total of three seconds. At time t=13, therefore, the head begins seeking to the Red Book information. At time t=14, substantially the same moment when the Red Book cache 206 has emptied, the read head is on the Red Book information and begins filling the Red Book cache 206 again. At this time, however, the Yellow Book cache 208 is emptying.

The process continues: Five seconds later, at time t=19, the Red Book cache 206 is filled. Yellow Book information, according to this embodiment, is being read from the cache 208 at 90 kb/s. This means that after two one-second seeks and a five second fill, 7×90=560 kb have been removed from the Yellow Book cache. The Yellow Book cache is therefore not completely empty at time t=25 at which time it begins filling again.

The Yellow Book cache 208 is filled while reading. The filling occurs at 300 kb/s and the reading at 90 kb/s, leaving an effective fill rate of 210 kb/s. After 560/210=approximately 2.6 seconds, the Yellow Book cache 208 is again filled at a time which is referred to herein for convenience as t=19. Control then returns to the Red Book cache 206, to repeat the process.

It should be apparent that this alternating filling and emptying operation maintains both caches emptying at the same time, but never completely emptied. Different data rates could adjust the slopes in the time chart of FIG. 3A.

It was found by the inventor that, unexpectedly, a smaller cache size allows faster response to commands. Any time a command for a different track or a different interactive video is made, the current cache will be emptied prior to implementing the command; with the caching system alternating between reading yellow track data 104 and red track data 102.

Yellow track data includes video, e.g. Quick Time (TM) movies, still images and audio. The audio in the yellow tracks 104 is associated with the interactively-chosen program, and hence is different, in general, than the audio in the red tracks 102, 106. According to the present invention, the program may also attenuate the red audio while yellow audio is playing. The red audio remains uninterrupted in content even when it may be attenuated. This attenuation can be carried out in any well-known way.

Figure 4:
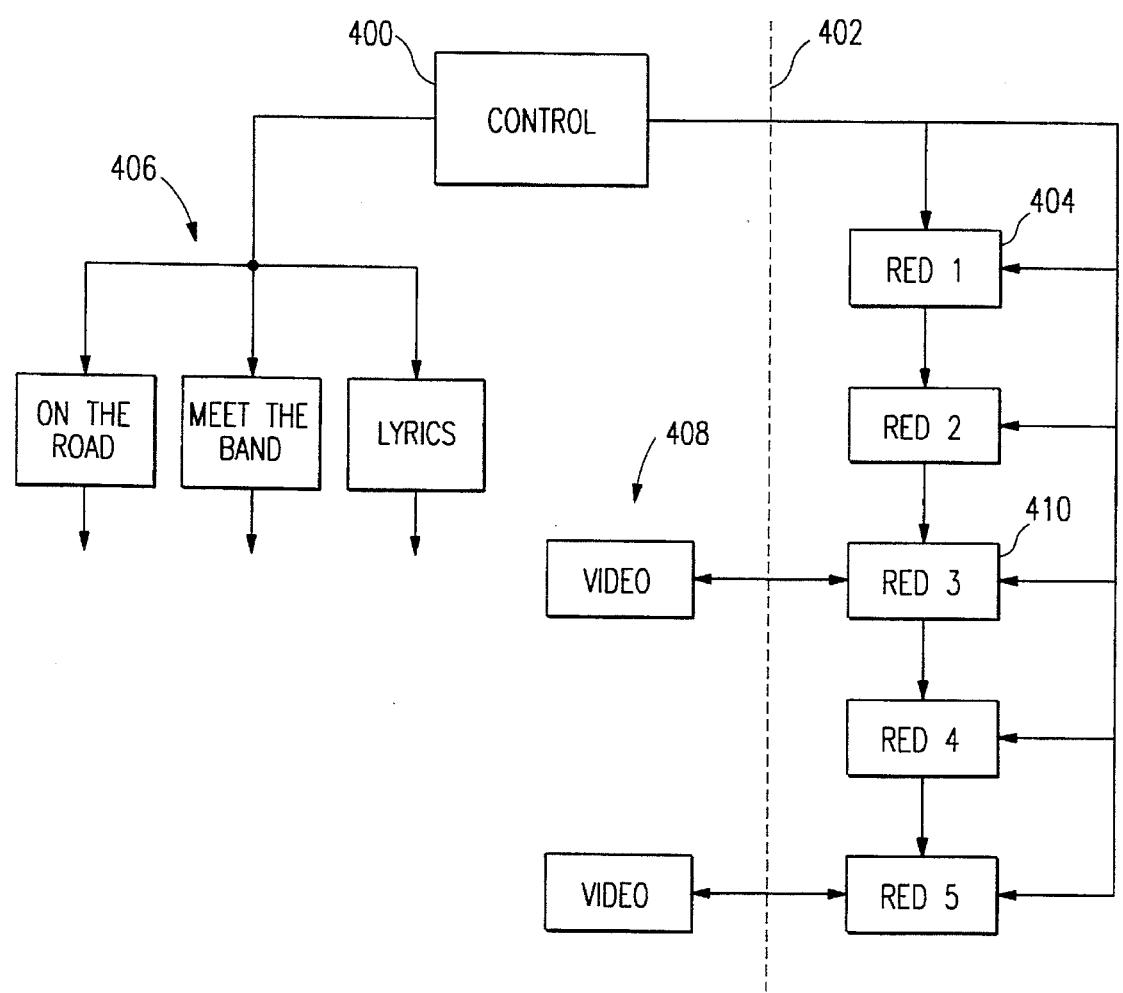
FIG. 4 shows an interactive flowchart of exemplary information recorded on the media of the present invention.

A sample interactive flowchart is shown in FIG. 4. Control module 400 schematically represents the process of control of the various interactive segments of FIG. 4. The line 402 represents the interface between yellow tracks and red tracks. Everything to the left of line 402 is held in Yellow Book cache 208, and everything to the right of line 402 is held in Red Book cache 206. During all times of operation, one of the red tracks, shown as track 404, is being held in the red cache 206 to be continuously played.

There are two kinds of yellow tracks on the disc: the unassociated tracks 406 and the associated tracks 408. The associated tracks 408 are each associated with a red track. For example, a video such as segment 408 is associated with a particular red track 410 and hence provides video that is associated with that red track 410. The unassociated video, such as 406, is not associated with any particular red track, and hence can be requested by the user at any time. The unassociated interactive video includes information such as "on the road", showing information about the band's tours, "meet the band" which includes personal, biographical and professional information about members of the band, and song lyrics. This is more conventional liner note type of information and can be requested at any time.

Figure 5:
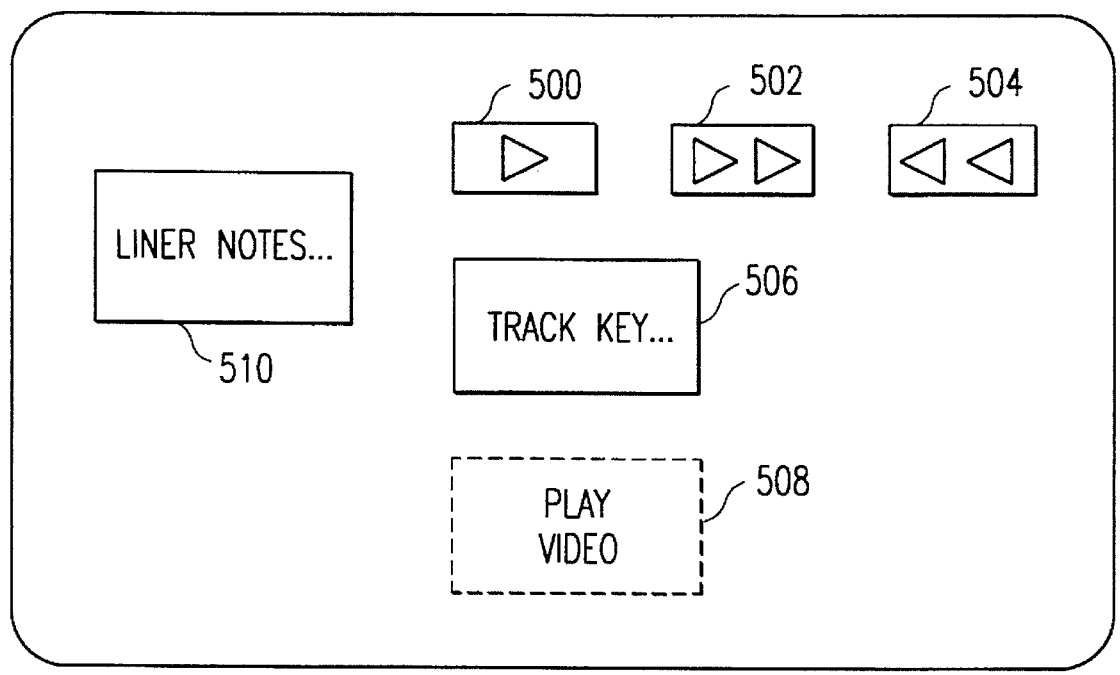
FIG. 5 shows a sample control screen used by the program of the present invention to control the information which is being reproduced.

The control screen which is preferably used for operating this system is shown in FIG. 5. The control screen includes standard CD playing icons such as play icon 500, skip forward icon 502 and skip backwards icon 504. A specific track can also be selected from the keyboard using track key 506. A video associated with the currently-played track can be played if available as shown by "play video" icon 508. This icon will be displayed in high contrast if available; otherwise the icon will be displayed in shadow.

Selecting the liner notes icon 510 brings up a menu showing the different categories of liner notes which are available. This includes, in this embodiment, those videos shown as 406 in FIG. 4. For example, a video or still pictures of the band on the road, including a fans video, band interview and live performance. A meet the band segment includes names and biographies on the members of the band as well as some graphics images thereof. An in the studio portion may include a studio tour and information about the producer. Songs and lyrics includes information about the various songs, and the lyrics of the songs. Of course, it should be understood that different ways of organizing the flow chart are possible.

Second Embodiment

The second embodiment is intended for operation with a next generation CD-ROM player in which the information indicative of Red Book is passed as data. This information on the CD-ROM, however, is not sample accurate. According to the present invention, appropriate sample-indicating codes are stored on the CD-ROM, into either the R3W bits, or into the P, Q code, to enable the system to read the Red Book data on a sample accurate basis.

In this embodiment, therefore, the red track data is real red track data, not a yellow track copy of red track data. The basic system of the second embodiment is similar to that of the first embodiment. It uses the same preferred layout shown in FIG. 2. The cache memory 204 is divided into a Red Book cache area 206 and a Yellow Book cache area 208. The operation is precisely the same as that in the first embodiment, except that:

the read head alternates between the Yellow Track information and the Red track information, rather than accessing a Yellow track copy of the Red track information; and a sample indicating code, which essentially mimics sample accurate operation, is read from the disc along with the data content, to allow the system to pick up where it leaves off.

Although only a few embodiments have been described in detail above, those having ordinary skill in the art will certainly understand that many modifications are possible in the preferred embodiment without departing from the teachings thereof.

For example, while the control of this embodiment has been described as operating using a microprocessor and peripheral hardware, it could also be carried out using an entirely hardware-based configuration.

All such modifications are intended to be encompassed within the following claims.

What is claimed is:

1. A method of playing information from a storage medium which includes first continuously uninterrupted program information and second interactively-selectable program information that does not interrupt the first program unless such an interruption is selected, comprising the steps of:

first reading a first area of the medium which includes the first program information thereon at a rate which is faster than a reproduction rate at which said first program information must be output to prevent unintended interruption of program information;

first outputting said first program information at said reproduction rate while simultaneously storing parts of said first information in a first cache;

first determining when said first cache reaches a predetermined level of fill;

second determining a desired interactive program to be played;

second reading, subsequent to said first reading and responsive to said first and second determining steps, a second area of the medium which includes said desired interactive program, said reading being carried out at a rate which is faster than a reproduction rate at which said second information is output, and simultaneously filling a second cache with contents of said second information;

second outputting, subsequent to said first outputting, said second information at said reproduction rate while simultaneously storing parts of said second information in a second cache;

second determining, subsequent to said first determining, when said second cache reaches a second predetermined level of fill;

subsequently repeating said first reading step, said first outputting step, said first determining step, said second reading step, and said second determining step, wherein said predetermined level of fill of said first cache is a level of fill which allows said first information in said first cache to be played for an amount of time at least equal to a time of said first seeking step plus a time of said second seeking step, plus a time required to fill said second cache to said predetermined level of fill of said second cache.

2. A method as in claim 1 wherein said first reading includes the steps of first seeking an area on said medium where said first information is physically located, and said second reading step includes the step of second seeking an area on said medium where said second information is physically located.

3. A method as in claim 1 wherein said first information is Red Book audio information, and said second information is Yellow Book data information.

4. A method as in claim 1 comprising the further step of reading a third area of the storage medium, subsequent to said first and second reading steps, said third area being different than said first or second areas of the disc, to obtain third information which has the same content as said first information but which is recorded in a different format than said first information.

5. A method as in claim 4 wherein said first information is recorded in Yellow Book format and said third information includes the same information as said first information, but recorded in Red Book format.

6. A method as in claim 3 wherein said first reading step reads at least 300 kb/s, said reproduction rate is 150 kb/s, and said second reading step reads at 300 kb/s.

7. A method as in claim 6 wherein said second reproduction rate is 90 kb/s.

8. A method as in claim 1, comprising the step of attenuating a volume of said first information when said second information is selected.

9. A method as in claim 1, wherein said second reading step occurs before said first reading step on initial start up.

10. A method of playing information from a storage medium which includes first continuously uninterrupted program information and second interactively-selectable program information that does not interrupt the first program unless such an interruption is selected, comprising the steps of:

first reading a first area of the medium which includes the first program information thereon at a rate which is faster than a reproduction rate at which said first program information must be output to prevent unintended interruption of program information;

first outputting said first program information at said reproduction rate while simultaneously storing parts of said first information in a first cache;

first determining when said first cache reaches a predetermined level of fill;

second determining a desired interactive program to be played;

second reading, subsequent to said first reading and responsive to said first and second determining steps, a second area of the medium which includes said desired interactive program, said reading being carried out at a rate which is faster than a reproduction rate at which said second information is output, and simultaneously filling a second cache with contents of said second information;

second outputting, subsequent to said first outputting, said second information at said reproduction rate while simultaneously storing parts of said second information in a second cache;

second determining, subsequent to said first determining, when said second cache reaches a second predetermined level of fill;

subsequently repeating said first reading step, said first outputting step, said first determining step, said second reading step, and said second determining step, wherein said predetermined level of fill of said second cache is a level of fill which allows said second cache to be played for an amount of time at least equal to a time of said first seeking step plus a time of said second seeking step, plus a time required to fill said first cache to said predetermined level of fill.

11. A device for reading information stored on different areas of an information storage medium, comprising:

first means, having portions sized and arranged to receive a readable medium thereon, and including a movable reproducing head, which moves to access different areas of said medium;

means for controlling said head to read said different areas;

a memory, including a first cache area receiving information from a first area of said medium and a second cache area receiving information from a second area of said medium; and controlling means for controlling access to said memory, to simultaneously read information out of said first and second cache areas and to read information into at least one of said first and second cache areas, in a way such that said first cache area is never completely emptied, and such that program information indicative of information in said first cache area is produced in an uninterrupted manner, wherein said at least one cache area is filled to a level of fill which allows said first information in said first cache to be played for an amount of time at least equal to a time of seeking that is required by said controlling means, plus a time required to fill said at least one cache to said predetermined level of fill.

12. A device as in claim 11 wherein said first and second information are recorded in Yellow Book format, said first information being Yellow Book format information indicative of Red Book audio, and said second information being Yellow Book format information indicative of interactively-selectable programs.

13. A device as in claim 11 wherein said memory is a dual port memory.

14. A device as in claim 11 wherein said first means includes means for alternately reading a first area for a predetermined time followed by reading a second area for a second predetermined time.

15. A method of presenting programs to a user, comprising the steps of:

recording a disc which has a first part that includes first and second kinds of information, the first information being continuously uninterrupted music information which is not interrupted unless so selected, and the second information being interactive information associated with said music information;

recording another copy of said music information in a second part of the disc in a format which is playable on standard CD players;

playing said disc in a CD-ROM type player by retrieving the music information from said first part of said disc and interactively retrieving the video information from the first part of said disc, storing said information in respective cache memories, and reading said information from said cache memories in a way which continually reproduces said music information;

reading the same disc using a standard CD audio player, including reading said information from said second part of said disc.

\* \* \* \* \*